United States Patent
Vrzic et al.

(10) Patent No.: US 10,447,547 B2
(45) Date of Patent: *Oct. 15, 2019

(54) METHOD AND APPARATUS FOR NFV MANAGEMENT AND ORCHESTRATION

(71) Applicant: Huawei Technologies Co., Ltd., Shenzhen (CN)

(72) Inventors: Sophie Vrzic, Kanata (CA); Jaya Rao, Ottawa (CA); Hang Zhang, Nepean (CA); Xu Li, Nepean (CA)

(73) Assignee: Huawei Technologies Co., Ltd., Shenzhen (CN)

(*) Notice: Subject to any disclaimer, the term of this patent is extended or adjusted under 35 U.S.C. 154(b) by 382 days.

This patent is subject to a terminal disclaimer.

(21) Appl. No.: 15/001,745

(22) Filed: Jan. 20, 2016

(65) Prior Publication Data

US 2016/0212016 A1 Jul. 21, 2016

Related U.S. Application Data

(60) Provisional application No. 62/119,620, filed on Feb. 23, 2015, provisional application No. 62/105,486, filed on Jan. 20, 2015.

(51) Int. Cl.
*G06F 15/173* (2006.01)
*H04L 12/24* (2006.01)

(52) U.S. Cl.
CPC .................. *H04L 41/12* (2013.01)

(58) Field of Classification Search
CPC ............... H04L 41/12; H04L 41/5051
USPC ........................................ 709/223
See application file for complete search history.

(56) References Cited

U.S. PATENT DOCUMENTS

| | | | |
|---|---|---|---|
| 8,756,302 B2 | 6/2014 | Cowan et al. | |
| 8,817,625 B1 | 8/2014 | Zhang et al. | |
| 2011/0196940 A1 | 8/2011 | Martinez et al. | |
| 2013/0151646 A1* | 6/2013 | Chidambaram | H04L 47/6205 709/213 |
| 2014/0201374 A1* | 7/2014 | Ashwood-Smith | H04L 49/70 709/226 |

(Continued)

FOREIGN PATENT DOCUMENTS

| | | |
|---|---|---|
| CN | 103428025 A | 12/2013 |
| JP | 2018503319 A | 2/2018 |

(Continued)

OTHER PUBLICATIONS

Hoang, D.H. et al., "A Proactive Concept for QoS Supports in Wireless Networks," retrieved from the internet on Nov. 17, 2016, http://citeseerx.ist.psu.edu/viewdoc/summary?doi=10.1.1.12.8058, 2001, 10 pages.

(Continued)

*Primary Examiner* — Atta Khan
(74) *Attorney, Agent, or Firm* — Slater Matsil, LLP

(57) ABSTRACT

Systems and methods for network functions virtualization (NFV)-management and orchestration (MANO) are provided where a virtualized network function (VNF)-forwarding graph (FG) including a plurality of VNFs is generated based on a customer request. The plurality of VNFs are instantiated at corresponding NFV infrastructure (NFVI)-points of presence (PoPs). A network service (NS) request including the generated VNF-FG may be constructed and added to a NS catalog.

15 Claims, 7 Drawing Sheets

(56) References Cited

U.S. PATENT DOCUMENTS

| | | | |
|---|---|---|---|
| 2014/0310388 A1 | 10/2014 | Djukic et al. | |
| 2014/0362730 A1 | 12/2014 | Zhang et al. | |
| 2015/0052243 A1 | 2/2015 | Lumezanu et al. | |
| 2015/0063166 A1* | 3/2015 | Sif ..................... | G06F 9/45558 370/254 |
| 2015/0288767 A1* | 10/2015 | Fargano ................. | H04L 43/08 709/227 |
| 2015/0295761 A1 | 10/2015 | Wang et al. | |
| 2016/0103698 A1* | 4/2016 | Yang ..................... | G06F 11/202 714/4.11 |
| 2016/0182379 A1* | 6/2016 | Mehra ................... | H04L 47/125 709/223 |
| 2016/0197818 A1 | 7/2016 | Stuart | |
| 2016/0212016 A1 | 7/2016 | Vrzic et al. | |
| 2016/0335111 A1* | 11/2016 | Bruun ................ | G06F 9/45558 |
| 2016/0373359 A1 | 12/2016 | Bruun et al. | |
| 2017/0317872 A1* | 11/2017 | Zhu ....................... | H04L 41/065 370/242 |
| 2017/0329639 A1* | 11/2017 | Morper ................. | G06F 9/5072 |
| 2018/0013617 A1 | 1/2018 | Djukic et al. | |

FOREIGN PATENT DOCUMENTS

| | | |
|---|---|---|
| WO | 2014166399 A1 | 10/2014 |
| WO | 2014197778 A1 | 12/2014 |

OTHER PUBLICATIONS

Mangili, M. et al., "Concise Paper: Stochastic Planning for Content Delivery: Unveiling the Benefits of Network Functions Virtualization," 22nd IEEE International Conference on Network Protocols, ICNP, Oct. 21-24, 2014, 6 pages.

"NFV ISG PoC Proposal A.1 NFV ISG PoC Proposal A.1.1 Poc Team Members; NFV(14) 000238r4_PoC_Proposal_SDN_Controlled_VNF_Forwarding_Graph", ETSI draft; NFV(14) 000238R4_POC_Proposal_SDN_Controlled_VNF_Forwarding_Graph, European Telecommunications Standards Institute(ETSI),650, Route Des Lucioles; F-06921 SOPHIA_ANTIPOLIS; France, vol. ISG-NFV, Nov. 25, 2014, XP014219347, 10 pages.

"Network Functions Virtualisation (NFV); Virtual Network Functions Architecture, Group Specification," ETSI GS NIFV0SWA 001, Dec. 2014, 93 Pages, V1. 1. 1.

"Network Functions Virtualisation (NFV); Virtual Network Functions Architecture, Group Specification," ETSI GS NFV0SWA 001, Dec. 2014, 93 Pages, V1. 1. 1.

"Launched world's first virtualized MVNO solution", Business Communication, English Abstract, vol. 51 No. 3, Mar. 2014, 3 Pages.

Chen, Y. et al., "Translating Service Level Objectives to Lower Level Policies for Multi-Tier Services," Cluster computing, 2008, 13 pages.

Clausen, J., "Branch and Bound Algorithms—Principles and Examples," Department of Computer Science, University of Copenhagen, Denmark, 1999. Internet resource: http://citeseerx.ist.psu.edu/viewdoc/summary?doi=10.1.1.5.7475, 30 pages.

Dolev, D. et al., "No Justified Complaints: On Fair Sharing of Multiple Resources," Proc. ITCS, 2012, 12 pages.

Francois, F. et al., "Leveraging MPLS Backup Paths for Distributed Energy-Aware Traffic Engineering," IEEE Transactions on Network and Service Management, Jun. 2014, 15 pages.

Halpern, J. et al., "Service Function Chaining (SFC) Architecture," IETF RFC 7665, Oct. 2015. https://tools.ietf.org/html/rfc7665, 32 pages.

Hawilo, H. et al., "NFV: State of the Art, Challenges and Implementation in Next Generation Mobile Networks (vEPC)," IEEE Network, vol. 28, No. 6, 2014, 11 pages.

Hoang, D.H. et al., "A Proactive Concept for QoS Supports in Wireless Networks," retrieved from the internet on Nov. 17, 2016, http://citeseerx.ist.psu.edu/viewdoc/summary?doi=10.1.1.12.8058, 2001, 10 pages.

Hu, F. et al., "A Survey on Software-Defined Network and OpenFlow: From Concept to Implementation," IEEE Communications Surveys & Tutorials, vol. 16, No. 4, Fourth Quarter, 2014, 26 pages.

Mangili, M. et al., "Concise Paper: Stochastic Planning for Content Delivery: Unveiling the Benefits of Network Functions Virtualization," 22nd IEEE International Conference on Network Protocols, ICNP, Oct. 21-24th, 2014, 6 pages.

Open Platform for NFV, downloaded from https://www.opnfv.org/software/technical-overview, Jan. 20, 2016, 3 pages.

Seetharaman, S., "OpenFlow/Software-Defined Networking," Deutsche Telekom Innovation Center, Nov. 2011, 41 pages.

Sezer, S. et al., "Are We Ready for SDN?—Implementation Challenges for Software-Defined Networks," IEEE Communications Magazine, vol. 51, No. 7, 2013, 13 pages.

Shen, W. et al., "vConductor: An NFV Management Solution for Realizing End-to-End Virtual Network Services," IEICE—Asia-Pacific Network Operation and Management Symposium (APNOMS), 2014, 6 pages.

Stillwell, M. et al., "Virtual Machine Resource Allocation for Service Hosting on Heterogeneous Distributed Platforms," Proc. IEEE IPDPS, 2012, 12 pages.

Tullberg, H. et al., "METIS System Concept: The Shape of 5G to Come," IEEE Communications Magazine, 2015, 13 pages.

Wood, T. et al., "Profiling and Modeling Resource Usage of Virtualized Applications," Proc. ACM/IFIP/USENIX Middleware, 2008, 20 pages.

"SDN Controlled VNF Forwarding Graph," (PoC Project Name), NFV ISG PoC Proposal A.1 NFV ISG PoC Proposal 4.1.1 PoC Team Members ; NFV ( 14 ) 000238r4_PoC_Proposal _SDN_Controlled VNF Forwarding_Graph, ETSI NFV IDS POC Proposal, XP 14219347, Nov. 2014, 10 pages.

Zaalouk, A. et al., "Network Configuration in OpenFlow Networks," 6th International Conference on Mobile Networks and Management, 2014, 14 pages.

Zhang, H. et al., "5G Wireless Network: MyNet and SONAC," IEEE Network, Jul./Aug. 2015, 10 pages.

"Network Functions Virtualisation (NFV); Management and Orchestration," ETSI GS NFV-MAN 001, V1.1.1, Group Specification, Dec. 2014, 184 pages.

Seetharaman, S., "OpenFlow/Software-defined Networking", Deutsche Telekom Innovation Center, Nov. 2011, 15 pages.

"Network Functions Virtualisation(NFV); Management and Orchestration", Group Specification, European Telecommunications Standards Institute(ETSI), 650, Route des Lucioles; F-06921 Sophia-Antipolis; France, vol. NFV MAN, No. V1.1.1, Dec. 21, 2014, XP014235740, 184 pages.

"NFV ISG PoC Proposal A.1 NFV ISG PoC Proposal A.1.1 Poc Team Members; NFV(14) 000238r4_PoC_Proposal_SDN_Controlled_VNF_Forwarding_Graph", ETSI draft; NFV(14) 000238R4_POC_Proposal_SDN_Controlled_VNF_Forwarding_Graph, European Telecommunications Standards Institute(ETSI),650, Route des Lucioles; F-06921 Sophia_Antipolis; France, vol. ISG-4-NFV, Nov. 25, 2014, XP014219347, 10 pages.

"Network Functions Virtualisation (NFV);Terminology for Main Concepts in NFV," ETSI GS NFV 003 v1.1.1., Oct. 2013, 10 pages.

* cited by examiner

METHOD AND APPARATUS FOR NFV MANAGEMENT AND ORCHESTRATION

This patent application claims priority to U.S. Provisional Application No. 62/119,620, filed on Feb. 23, 2015, entitled "Method and apparatus for NFV management and orchestration," and U.S. Provisional Application No. 62/105,486, filed on Jan. 20, 2015, entitled "Systems and Methods for SDT to Interwork with NFV and SDN", which are hereby incorporated by reference herein as if reproduced in its entirety.

TECHNICAL FIELD

The present invention relates to a method and apparatus for network virtualization, and, in particular embodiments, to a method and apparatus for network functions virtualization (NFV)-management and orchestration (MANO).

BACKGROUND

In the European Telecommunications Standards Institute (ETSI) NFV architecture, an orchestrator typically has access to data repositories including a network services catalog, a virtualized network function (VNF) catalog, a NFV Instances repository, and a NFV infrastructure (NFVI) resources repository.

The network services catalog is a repository of all the on-boarded network services. It includes a network services descriptor (NSD), a virtual link descriptor (VLD) and a VNF forwarding graph descriptor (VNFFGD). The VLD describes resource requirements that are needed for a link between VNFs, physical network functions (PNF) and endpoints. The VNFFGD includes a network forwarding path (NFP) element that includes an ordered list of connection points along with rules/policies associated to the list.

The VNF catalog is a repository of all the on-boarded VNF packages, and includes a VNF descriptor (VNFD) and software images. The VNFD describes a VNF in terms of its deployment and operational behavior, and is used by a virtual network function manager (VNFM) to instantiate the VNF and for lifecycle management of the VNF.

The NFV instances repository holds information of all VNF instances and network service (NS) instances. Each VNF instance is represented by a VNF record, and each NS instance is represented by an NS record.

The NFVI resources repository holds information about the available/reserved/allocated NFVI resources as abstracted by a virtual infrastructure manager (VIM) across an operator's infrastructure domains, and is used for resource reservation, allocation and monitoring.

SUMMARY

Technical advantages are generally achieved, by embodiments of this disclosure which describe a method and apparatus for network functions virtualization (NFV) management and orchestration (MANO).

In accordance with an embodiment, a method for network function virtualization (NFV)-management and orchestration (MANO) is provided. In this example, the method includes receiving, by a processing system, a customer request for a network service. The method also includes generating a virtualized network function (VNF)-forwarding graph (FG) based on the customer request. The VNF-FG includes a plurality of VNFs. An apparatus for performing this method is also provided.

In accordance with another embodiment, a computer program product including a non-transitory computer readable storage medium is provided. In this example, the non-transitory computer readable storage medium stores programming that includes instructions to generate a virtualized network function (VNF)-forwarding graph (FG) based on a customer request for a network service. The VNF-FG includes a plurality of VNFs.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Within a European Telecommunications Standards Institute (ETSI) compliant network functions virtualization (NFV)-management and orchestration (MANO) architectural framework, an orchestrator receives a network service (NS) request, and determines a virtualized network function (VNF)-forwarding graph (FG) based on the NS request. A VNF-FG is predefined for each available NS request, and NS requests and VNF-FGs may be defined manually. The orchestrator may select a VNF-FG that is corresponding to the NS request from a NS catalog.

Aspects of the present disclosure provide methods for generating a VNF-FG from a customer request for a network service. In one embodiment, the VNF-FG is generated using network service information included in the customer request. In such an embodiment, the VNF-FG is not predefined but generated automatically based on the customer request. A NS request may also be constructed using the network service information of the customer request and the VNF-FG, and may be added to a NS repository or catalog. Aspects of the present disclosure also provide various embodiment systems for performing NFV-MANO, in which a VNF-FG is generated based on a customer request. Determination of a VNF-FG, NFV infrastructure (NFVI)-points of presence (PoPs) for VNFs in the VNF-FG, and instantiation of the VNFs may be performed by one software entity or by different software entities. These and other inventive aspects are explained in greater details below.

Figure 1:
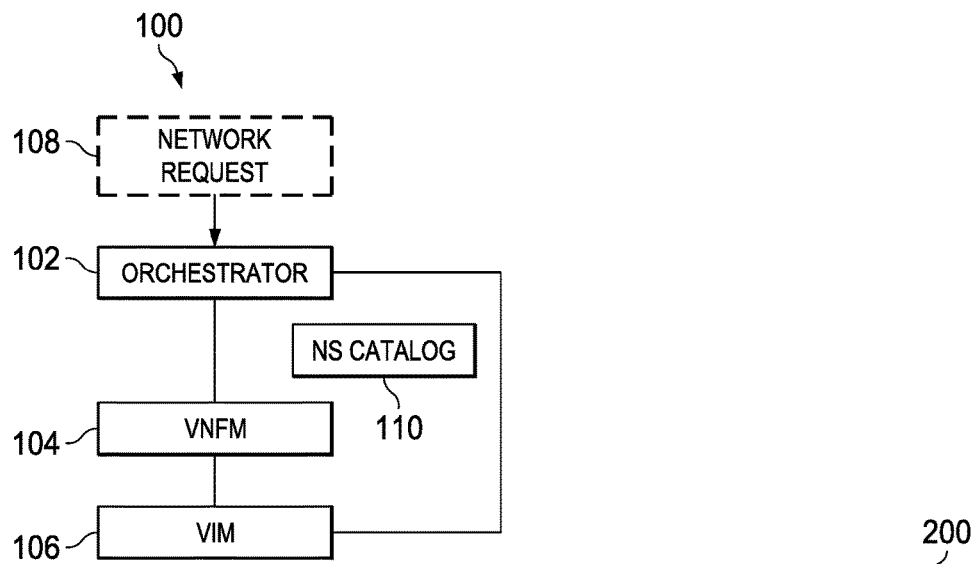
FIG. 1 illustrates a block diagram of an embodiment system for performing NFV-MANO.

FIG. 1 illustrates a block diagram of an embodiment NFV-MANO system 100 which may be deployed as an ETSI NFV-MANO system. The system 100 includes an orchestrator 102, a virtual network function manager (VNFM) 104, and a virtual infrastructure manager (VIM) 106. In some embodiments, the orchestrator 102 is in charge of the network wide orchestation and management of NFV resources, as well as realizing NFV service topologies on NFVI. For example, the orchestrator 102 may be configured to manage NFVI resources across multiple VIMs and lifecycles of network services. A VNFM 104 is configured to provide lifecycle management of VNF instances, and a VIM 106 is configured to control and manage NFVI computing, storage and network resources within a domain.

As shown in FIG. 1, the orchestrator 102 receives a network request 108 such as a network service request. In accordance with the received request 108, the orchestrator 102 determines a forwarding graph (FG). In some embodiments, the determination of the forwarding graph is done in accordance with a NS catalog 110. As described in the (ETSI) group specification (GS) NFV 003 v1.1.1, entitled "Network Functions Virtualisation (NFV); Terminology for Main Concepts in NFV," published October 2013, which is incorporated herein as if reproduced in its entirety, a network service is a composition of network functions and is defined by its functional and behavioral specifications. According to the ETSI NFV-MANO architectural framework, a network service request may be described by a VNF-FG, and a VNF-FG is predefined for each network service. A VNF-FG defines a logical topology corresponding to a requested network service. A network function (NF) forwarding graph is a graph of logical links connecting NF nodes for the purpose of describing traffic flow between these NF nodes. A VNF-FG is a NF forwarding graph where at least one NF node is a VNF node. VNF-FGs may be developed by service providers or by their system integration partners. Conventional service provider networks typically rely on personnel (e.g., subject matter experts) to generate VNF-FGs upon receiving a network request for a network service. In one embodiment, service providers use a template of typical network services to manually define customized network services. A network service (NS) catalog may be viewed as a network service database that can map a network service to a corresponding VNF-FG. The orchestrator 102 receiving the network request 108 may select the corresponding VNF-FG for the network request 108 from the network service database. Throughout this disclosure, the term "network request" and the term "network service (NS) request" are used interchangeably. Throughout the disclosure, the term "NS request" may include a network service with a corresponding VNF-FG, or a network service described by a VNF-FG. Throughout the disclosure, the terms "VNF-FG" and "FG" are used interchangeably. The terms "NFVI-PoP" and "PoP" are also used interchangeably.

The orchestrator 102 may determine NFVI-PoPs for the VNFs included in the VNF-FG, and instantiate the VNFs at the determined NFVI-PoPs. A NFVI-PoP is a network point of presence where a network function is or could be deployed as a VNF. Instantiation of a VNF herein refers to creating an instance of the VNF on one or more physical network devices corresponding to a NFVI-PoP.

A Software defined topology (SDT) entity may establish a virtual network topology or a virtual data-plane logical topology for a service. An SDT entity autonomously creates a virtual network topology in accordance with network service requirements. In some embodiments, an SDT entity may determine an FG, including the number of instances of network functions in the FG. The SDT entity may also determine forwarding paths (e.g., for the control plane and data plane) and a point of presences (PoP) for each network function in the FG. In some embodiments, an SDT entity may be implemented as a function within a topology manager, and the topology manager may generate an FG based on a customer request and perform functions of an orchestrator as well.

SDT entities may be combined with NFV entities. In one example, an SDT entity is a virtual function instantiated by an NFV-MANO. A SDT entity provides a logical topology to an orchestrator corresponding to a NS request, and may communicate with the orchestrator via a management interface between the SDT entity and the orchestrator.

Input to an SDT entity may include a network service request, traffic information, NFVI information, and a trigger. The network service request provides a service traffic description, which may include node distribution, traffic characteristics, etc. The network service request may also provide a service function description, which may include service function chains or a VNF-FG, and function characteristics. Examples of function chains and function characteristics include a stateless function or a state-full function, function overhead on storage, CPU, and traffic rate, and function instantiation constraints, such as a minimum or maximum number of PoPs, and preferred/un-preferred PoPs.

Traffic quality requirements may include traffic QoS requirements and user quality of experience (QoE) requirements. Service function quality requirements may include effectiveness and efficiency requirements. Function effectiveness may include probability of event detections, or probability of false alarms. Function efficiency may include reporting-response delay. Traffic information may include statistical loading per physical link, per node, and/or per logical link, and may be obtained from, e.g., data analytics.

NFVI information may include PoP locations, per-PoP function availability, and per-PoP processing load bounds. In one embodiment, the NFVI information may include statistical load, delay, capacity between devices, base stations (BSs), routers, and NFVI-PoPs, as well as nominal remaining network resources, such as physical link capacities, and radio resources. A triggering event may initiate a change in a network service. In one embodiment, the triggering event occurs after a timeout period or when a performance condition is satisfied, e.g., when a service, SDT, and/or a traffic engineering (TE) performance metric falls below, or rises above, a threshold. In another embodiment, the triggering event is elicited by a human action, e.g., a service provider manually prompts the triggering event.

Figure 2:
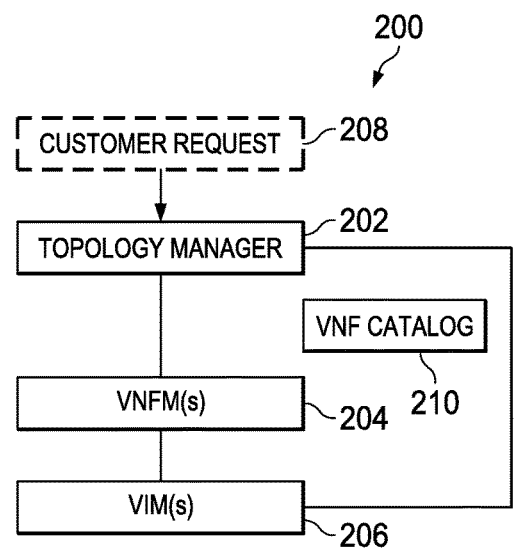
FIG. 2 illustrates a block diagram of another embodiment system for performing NFV-MANO.

FIG. 2 illustrates a block diagram of an embodiment system 200 for performing NFV-MANO. The system 200 includes a topology manager 202, a VNFM 204, and a VIM 206. The topology manager 202 may be a software module or entity that is configured to perform the functions of an orchestrator as well as generates an FG based on a customer request 208. In some embodiments, the topology manager 202 may translate an incoming customer request into a VNF-FG, which, in essence, is a logical topology (or graph) including service specific VNFs (or vertices) interconnected by logical links (or edges). The topology manager 202 may use SDT techniques to generate an FG. A VNF catalog 210 may comprise a database of various VNFs that can be instantiated, and may be accessed by the Topology Manager 202 in the instantiation of VNFs in the FG.

Figure 3:
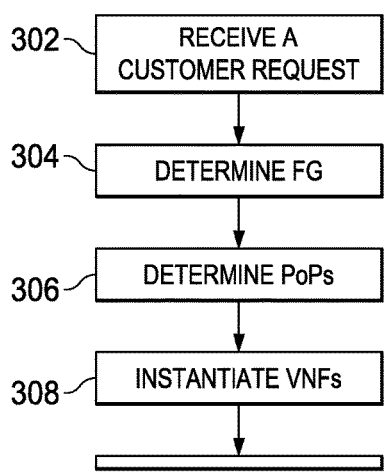
FIG. 3 illustrates a flowchart of an embodiment method for NFV-MANO.

FIG. 3 illustrates a flowchart for an embodiment method 300 of NFV-MANO that may be used in the system 200 in FIG. 2. As shown, a topology manager receives a customer request for a network service (Step 302) from a customer. In response to the receipt of the customer request, the topology manager generates, or determines, a VNF-FG according to the customer request (Step 304). A customer request may include a checklist of basic network components or service requirements that is used to build a VNF-FG. For example, the customer may request a Long Term Evolution (LTE) network (e.g., from a list of templates) and additional service specific network functions. The topology manager may construct a network service by use of the checklist, and generate a VNF-FG according to the constructed network service, e.g., using a network service catalog. In one embodiment, the VNF-FG may include additional VNFs that are not service specific but relevant to assessing and enhancing network performance, e.g., the VNF-FG may include VNFs for traffic analytics or QoE monitor. These additional VNFs may also be accessible from a VNF catalog.

The topology manager may then determine a NFVI-PoP for each of the VNFs in the VNF-FG (Step 306). A NFVI-PoP is a network point of presence where a network function is or could be deployed as a VNF. For example, the topology manager may identify NFVI-PoPs corresponding to the VNFs in the VNF-FG in a physical network where the forwarding graph may be embedded. In one embodiment, a NFVI-PoP associated with a VNF may be determined by checking the feasibility of a plurality of available NFVI-PoPs that can support the VNF, e.g., using the NFVI information that is accessible via a VIM, and selecting a feasible NFVI-PoP from the plurality of available NFVI-PoPs. With the NFVI-PoPs determined, the topology manager can then instantiate the VNFs at the determined NFVI-PoPs using one or more VNFMs and VIMs (Step 308). In one embodiment, after the NFVI-PoPs are determined, the topology manager may instruct one or more VNFMs and VIMs to instantiate the corresponding VNFs. In one embodiment, a VIM may reserve a container, e.g., a computing resource at a network node, for each of the VNFs, and a VNFM may instantiate the VNFs on the containers. In some embodiments, the topology manager may jointly, instead of sequentially, determine the VNF-FG and NFVI-PoPs.

An event/instruction (e.g., aVNF scale in/out) may prompt a VIM or a VNFM to instruct, or request that, the topology manager move a VNF to a new PoP. The topology manager may move the VNF to the new PoP by performing a sequence of steps that is similar to Steps 306-308.

Figure 4:
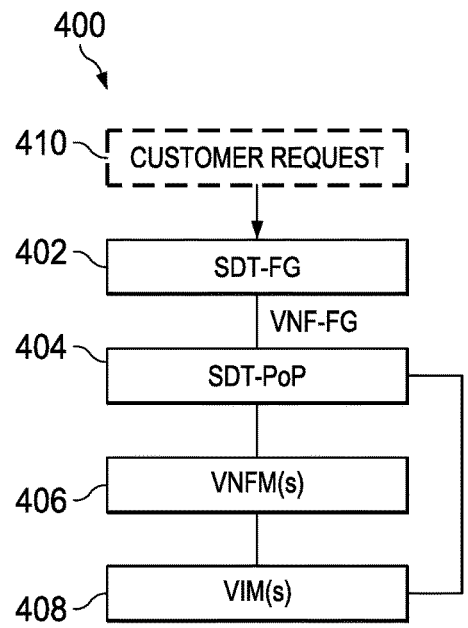
FIG. 4 illustrates a block diagram of yet another embodiment system for performing NFV-MANO.

FIG. 4 illustrates a block diagram of another embodiment system 400 for performing NFV-MANO. The system 400 includes an SDT-FG entity 402, an SDT-PoP entity 404, a VNFM 406, and a VIM 408. In some embodiments, the SDT-FG entity 402 and the SDT-PoP entity 404 are software modules or entities for generating a forwarding graph based on a customer request 410 and determining PoPs for VNFs in the forwarding graph, respectively. In one embodiment, the SDT-FG entity 402 may use SDT techniques to generate a forwarding graph based on the customer request 410. The SDT-PoP entity 404 may also be configured to instruct instantiation of the VNFs in the forwarding graph using the one or more VNFMs 406 and one or more VIMs 408. In some embodiments, service requirements corresponding to the customer request 410 may be translated by the SDT-FG entity 402 into a forwarding graph, which includes VNFs and logical links. The resulted forwarding graph may then be provided to the SDT-PoP entity 404 as a NS request. Based on resource availability at NFVIs, PoPs corresponding to the VNFs may be determined by the SDT-PoP entity 404, which may generate instructions to the VNFMs 406 and VIMs 408 to instantiate the VNFs at the corresponding PoPs.

Figure 5:
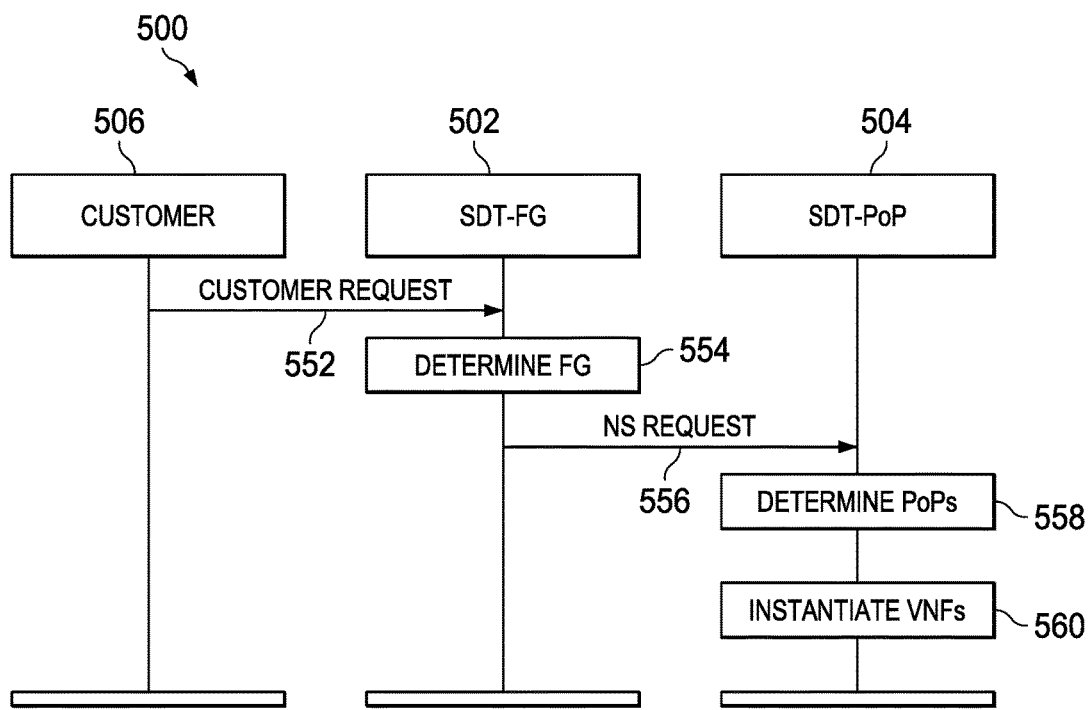
FIG. 5 illustrates a sequence diagram of another embodiment method for NFV-MANO.

FIG. 5 illustrates a message flow diagram for an embodiment method 500 of NFV-MANO, which may be used in the system 400 of FIG. 4. An SDT-FG entity 502 receives a customer request for a network service (Step 552) from a customer 506, and generates or determines a VNF-FG according to the customer request (Step 554). In one embodiment, the SDT-FG entity 502 may use or combine basic network services provided in the customer request to construct a new network service, and generate a VNF-FG using the new network service and a network service catalog. The SDT-FG entity 502 may construct and send a network service (NS) request to an SDT-PoP entity 504 (Step 556). The NS request may include the generated VNF-FG and a network service corresponding to the VNF-FG. The NS request may be constructed by the SDT-FG entity 502. The SDT-PoP entity 504, upon receipt of the NS request, may determine NFVI-PoPs for the VNFs indicated in the VNF-FG (Step 558) and instantiate the VNFs using one or more VNFMs and VIMs (Step 560).

In the embodiment as shown in FIG. 5, the FG and the NFVI-PoPs are determined sequentially by the SDT-FG entity 502 and the SDT-PoP entity 504, respectively. Further, the FG and the NFVI-PoPs are determined and provided by different entities, which may be beneficial because the SDT-FG entity 502 and the SDT-PoP entity 504 may be supported and maintained by different vendors. Each of the SDT-FG entity 502 and the SDT-PoP entity 504 may have an interface defined so that they may communicate with each other. In the event of a VNF scale in/out trigger sent to a VNFM or a VIM, such as the VNFMs 406 or the VIMs 408, a trigger message of this trigger may be forwarded to the SDT-PoP entity 504, which may repeat the steps of 558 and 560 determining new NFVI-PoPs and instantiating the VNFs at the new PoPs.

Figure 6:
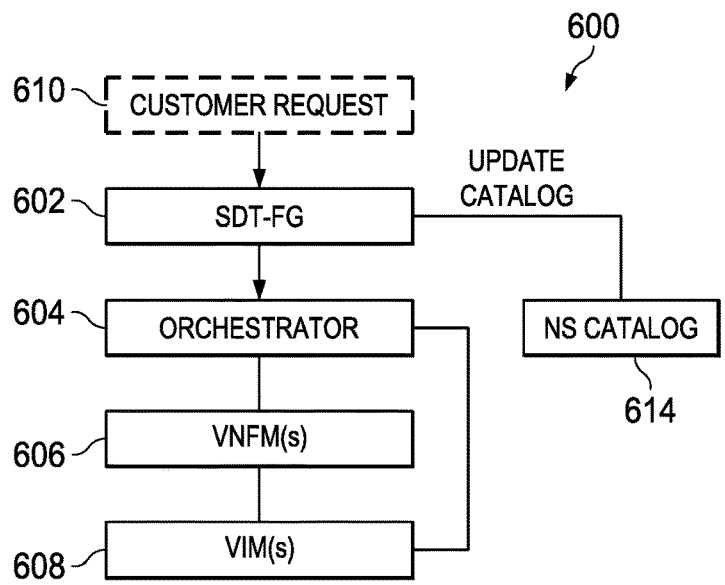
FIG. 6 illustrates a block diagram of yet another embodiment system for performing NFV-MANO.

FIG. 6 illustrates a block diagram of another embodiment system 600 for performing NFV-MANO. In this example, the system 600 includes an SDT-FG entity 602, an orchestrator 604, a VNFM 606, and a VIM 608. The SDT-FG entity 602 is configured to generate an FG based on a customer request 610. This generated FG can be used to update a NS catalogs 614 with the generated FG and network service information included in the customer request 610. For example, upon receipt of the customer request 610, the SDT-FG entity 602 may translate the service requirements of the customer request into an FG. The FG is provided to orchestrator 604. The orchestrator 604 is configured to determine PoPs for VNFs in the FG and instruct the instantiation of the VNFs using the one or more VNFMs 606 and one or more VIMs 608 at the corresponding PoPs. In one embodiment, the SDT-FG entity 602 may construct a NS request using the generated FG and send the NS request to the orchestrator 604 for determination of PoPs of VNFs and instantiation. In this the example, the system 600 may be built upon the NFV-MANO system 100 as shown in FIG. 1, where the output of the SDT-FG entity 602, i.e., the NS request, is used as the input of the NFV-MANO system 100.

Figure 7:
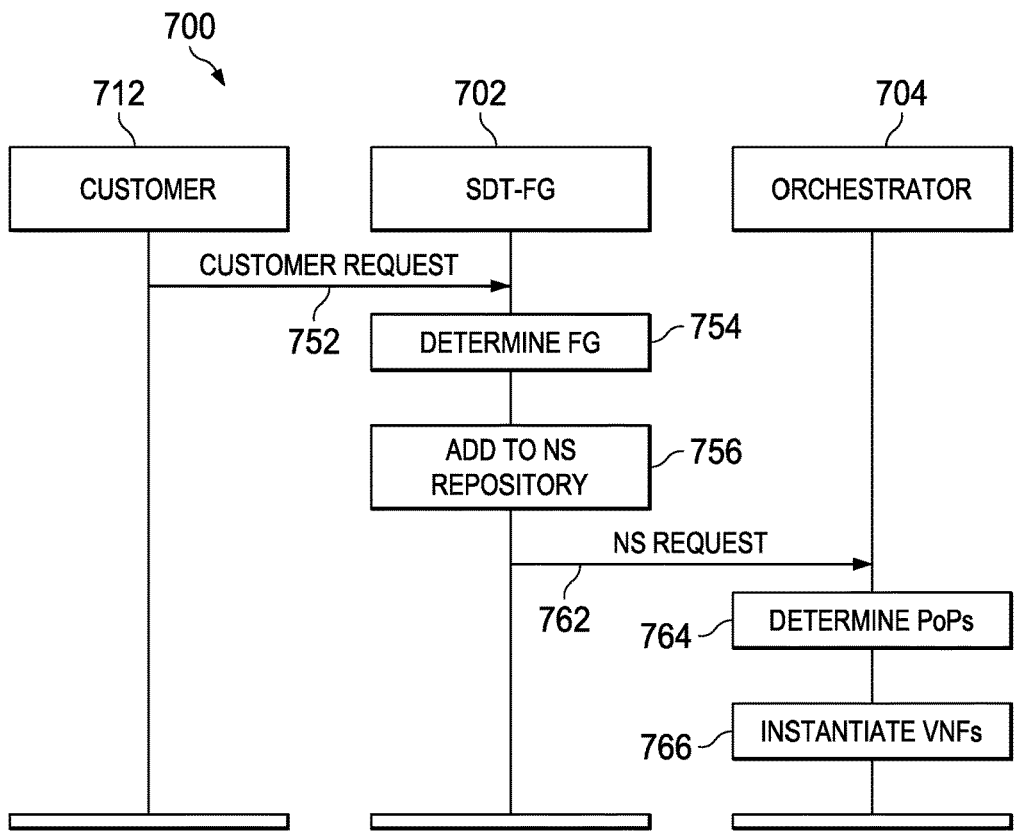
FIG. 7 illustrates a sequence diagram of yet another embodiment method for NFV-MANO.

FIG. 7 illustrates a sequence diagram 700 for an embodiment method of NFV-MANO, which may be used in the system 600 in FIG. 6. An SDT-FG entity 702 receives a customer request for a network service (Step 752) from a customer 712. In response to the receipt of customer requests 752, SDT-FG 702 determines or generates an FG corresponding to the customer request (Step 754). In one embodiment, the SDT-FG entity 702 may generate the FG using network service templates and a checklist including basic network functions. The SDT-FG entity 702 then constructs a NS request which includes the customer request information and the generated FG, and adds the NS request to a NS repository or catalog (Step 756). In one embodiment, a NS request may be constructed which includes a network service and a corresponding FG, and may be reused after being archived in the NS catalog. For example, the FG may be reused when a customer request for a similar network service is received.

The SDT-FG entity 702 sends the NS request to an orchestrator 704 (Step 762). Upon receipt of the NS request, the orchestrator 704 acts on the request using any of a number of different methods including those illustrated in FIG. 1. For example, based on the NS request, the orchestrator 704 may determine (Step 764) NFVI-PoPs for the VNFs indicated in the FG and instruct one or more VNFMs and VIMs, such as the VNFMs 606 and VIMs 608, to instantiate the VNFs (Step 766). Those of ordinary skill in the art will appreciate that sending the NS request in step 762 need not wait for the modification of the NS repository in step 756. These steps can happen in the opposite order as shown, or can happen at the same time.

In some embodiments, in the event of a VNF scale in/out trigger sent to either a VNFM or a VIM, a trigger message may be forwarded to the orchestrator 704, and the orchestrator 704 may repeat the Steps 764 and 766 as illustrated in FIG. 7. Alternatively, the VNFM or VIM may receive an indication of the need to scale in/out and handle the trigger directly.

Figure 8:
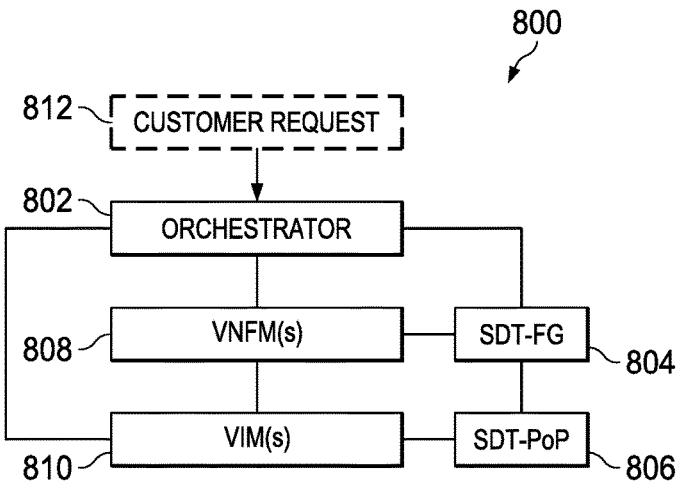
FIG. 8 illustrates a block diagram of yet another embodiment system for performing NFV-MANO.

FIG. 8 illustrates another embodiment system 800 for performing NFV-MANO. The system 800 includes an orchestrator 802, an SDT-FG entity 804, an SDT-PoP entity 806, a VNFM 808, and a VIM 810. The SDT-FG entity 804 generates an FG based on a customer request 812. The customer request 812 is received by the orchestrator 802, and can then be forwarded to the SDT-FG entity 804. SDT-FG 804 generates an FG in accordance with the information associated with the customer request 812 received from the orchestrator 802. The SDT-PoP entity 806 determines PoPs for the VNFs in the FG. The orchestrator 802 is configured to instruct instantiation of the VNFs in the FG at the PoPs using the one or more VNFMs 808, and one or more VIMs 810.

Figure 9:
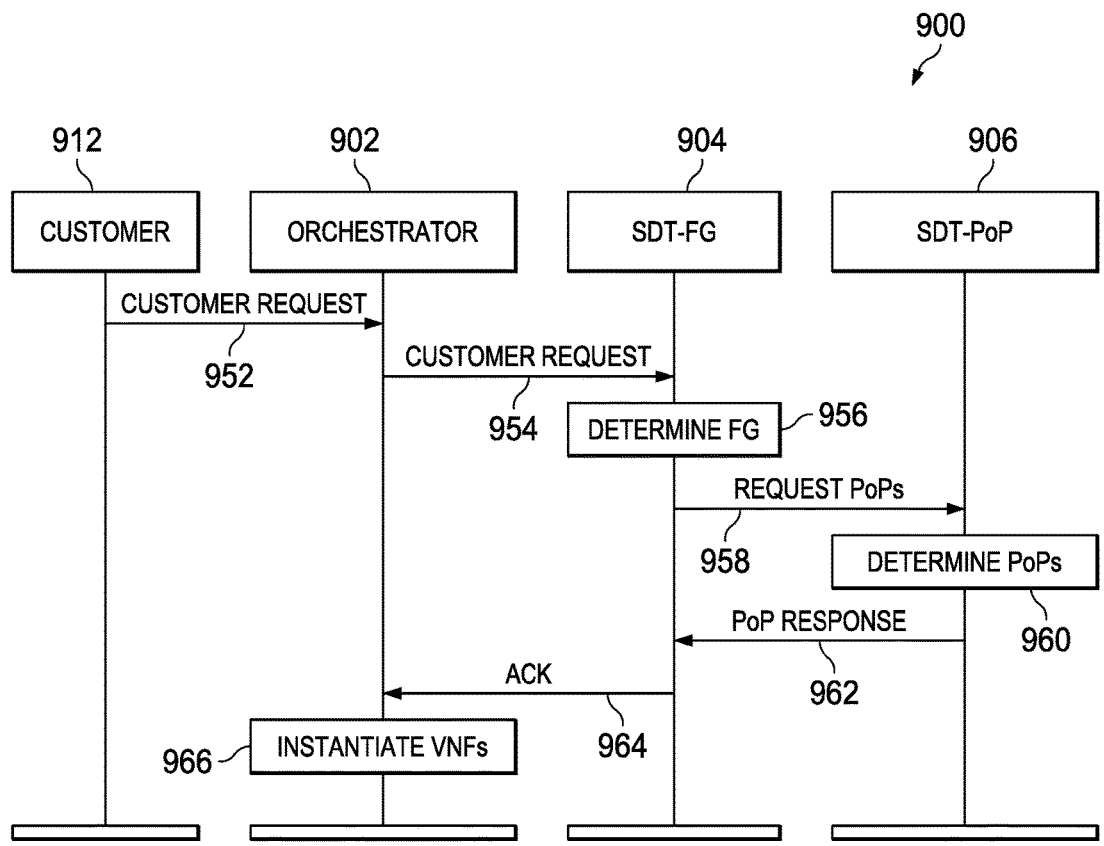
FIG. 9 illustrates a sequence diagram of yet another embodiment method for NFV-MANO.

FIG. 9 illustrates a sequence diagram for an embodiment method 900 of NFV-MANO, which may be used in the system 800 as illustrated in FIG. 8. Orchestrator 902 receives a customer request for a network service from a customer 912 (Step 952). The customer request, or information determined in accordance with the customer request, is transmitted to an SDT-FG entity 904 (Step 954). The SDT-FG entity 904 generates an FG in accordance with the received information (Step 956). Based on the determined FG, a request for a determination of the PoPs required to instantiate the FG is sent to an SDT-PoP entity 906 (Step 958). The SDT-PoP entity 906 then determines PoPs for the VNFs in accordance with the received request (Step 960) and sends a message, such as a PoP response message, to the SDT-FG entity 904 indicating it has finished the determination of the PoPs, in response to the request PoPs command (Step 962). Those of ordinary skill in the art will appreciate that the Request for PoPs transmitted in step 958 may include the determined FG. Similarly, the PoP Response message of step 962 may include a listing of the selected PoPs for each VNF in the FG. The SDT-FG entity 904, when receiving the PoP response message, may send an acknowledgement (ACK) message (Step 964) to the orchestrator 902, indicating the generation of the FG and determination of NFVI-PoPs for the VNFs in the FG. Upon receipt of the ACK message, the orchestrator 902 can instruct the instantiation of the VNFs included in the FG based on the NFVI-PoPs (Step 966) using one or more VNFMs and VIMs.

In some embodiments, the orchestrator 902 may issue an instruction to instantiate the VNFs in response to receipt of the ACK message from the SDT-FG entity 904. The instruction to instantiate may be sent to VNFMs and VIMs associated with PoPs of the VNFs, e.g., PoPs identified by the SDT-PoP 906 in step 960. Alternatively, the instruction to instantiate the VNFs may also come directly from the SDT-PoP entity 906 after the PoPs are determined. For example, the SDT-PoP entity 906 may send an instantiation command to a VNFM after the PoPs are determined. In the event of a VNF scale in/out trigger sent to either a VNFM or a VIM requesting for one or more VNFs to be moved to or instantiated at new PoPs, the trigger message may be forwarded to the SDT-PoP entity 906, and then the Steps 960-966 may be repeated. For example, upon receipt of the trigger message, the SDT-PoP entity 906 determines new PoPs requested, and sends a PoP response to the SDT-FG entity 904. The SDT-FG entity 904 then sends an acknowledgement message to the orchestrator 902 which sends instructions to instantiate the VNFs at the new PoPs.

In some embodiments, the orchestrator, the SDT-FG entity, and the SDT-PoP entity in the embodiments of the present disclosure may be implemented by the same service provider or different service providers. In other embodiments, the orchestrator, the SDT-FG entity, and the SDT-PoP entity may be implemented as different entities having interfaces to interact with each other. These entities may be enabled through software, and may be virtualized entities.

Figure 10:
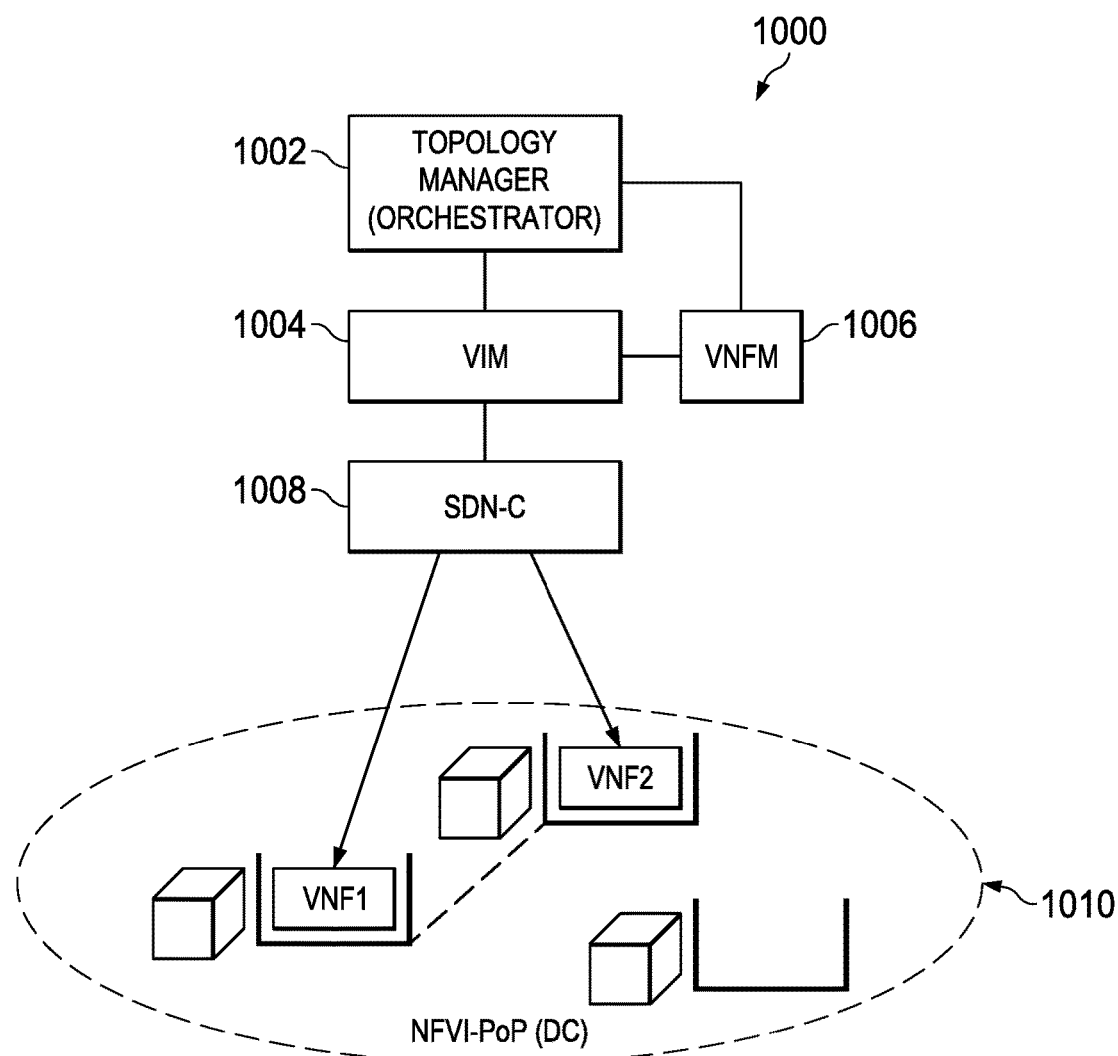
FIG. 10 illustrates a diagram of yet another embodiment system for performing NFV-MANO.

FIG. 10 illustrates a diagram of an embodiment NFV-MANO system 1000 with VNFs instantiated in a single datacenter (DC). A topology manager or an orchestrator 1002, has a view of resource availability for an entire network through a VIM 1004. The topology manager 1002 determines a VNF-FG, i.e., a logical topology, of VNFs based on a customer request, and determines PoPs for the VNFs in the VNF-FG, i.e., a physical topology for the VNFs. In this example, the VNF-FG includes two VNFs linked together, namely VNF1 and VNF2, and the two VNFs are co-located at the same NFVI-PoP 1010 (in this example, NFVI-PoP 1010 is a single data center). The VIM 1004 allocates and reserves resources, such as virtualization containers and physical links for the two VNFs. A VNFM 1006, acting on the instructions received from the orchestrator 1002, instantiates the VNFs. At the NFVI-PoP 1010, i.e., a data center, a software defined network controller (SDN-C) 1008 determines the physical links within its NFVI-PoP, and provides forwarding rules for the data plane containing the instantiated VNFs.

Figure 11:
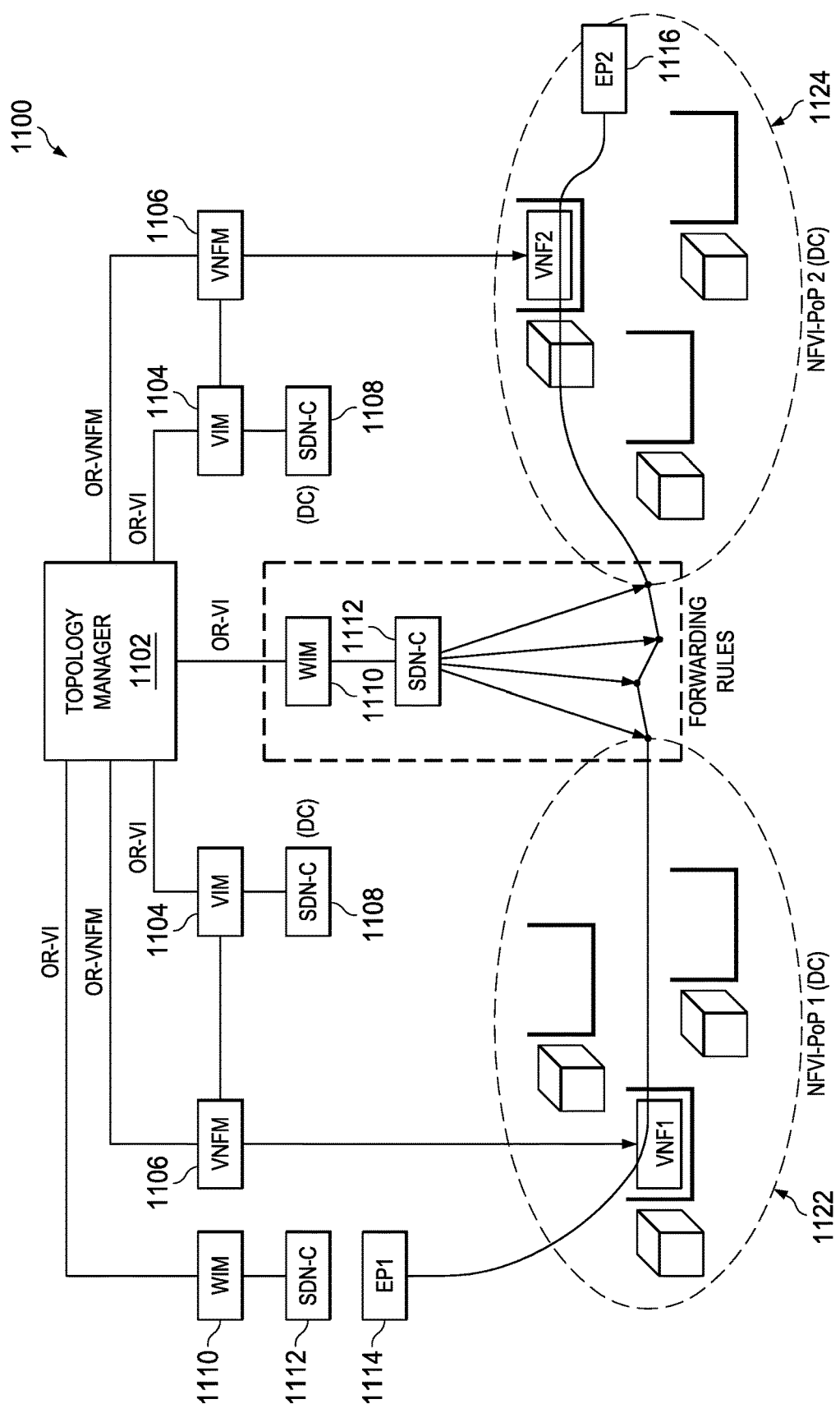
FIG. 11 illustrates a diagram of yet another embodiment system for performing NFV-MANO.

FIG. 11 illustrates a diagram of another embodiment NFV-MANO system 1100 with VNFs instantiated across multiple DCs. The system 1100 includes a topology manager 1102 in charge of orchestration and management of VNFs resources in the system 1100, multiple VIMs 1104 with each configured to reserve and allocate resources within its respective domain, and multiple VNFMs 1106 with each configured to instantiate VNFs within its respective domain. The system 1100 also includes multiple SDN-Cs 1108 each of which is within the domain of a VIM 1104. Each of the SDN-Cs 1108 determines corresponding physical links and provides forwarding rules within its NFVI-PoP. The system 1100 further includes multiple wide area network infrastructure managers (WIMs) 1110, each of which is a specialized VIM and provides the topology manager 1102 with an abstract view of resources between NFVI-PoPs 1122 and 1124. An SDN-C 1112 within the administrative domain of a WIM 1110 determines the physical links and provides forwarding rules between the NFVI-PoPs 1122 and 1124. Each of the VIMs 1104 or WIMs 1110 provides connectivity services within its administrative domain and provides an abstraction of the resources to the topology manager 1102. Each of the VIMs 1104 or WIMs 1110 also maintains the NFVI resources repository within its domain. For a customer request corresponding to a network service from an end point (EP) 1114 to an EP 1116 passing through a wide area network as shown in FIG. 11, a forwarding graph may be determined to include two VNFs, namely, VNF1 and VNF2, corresponding to the NFVI-PoP 1122 and the NFVI-PoP 1124, respectively. The VNF1 may be instantiated at the NFVI-PoP 1122 by a VNFM 1106, and the VNF2 may be instantiated at the NFVI-PoP 1124 by another VNFM 1106. It will be understood by those ordinarily skilled in the art that a second WIM 1110 and SDN-C 1112 may be available to Topology Manager 1102 so that it has visibility into (and control of) the resources used to connect EP 1114 to VNF1 inside NFVI-PoP1 1122. This operates much in the same manner as WIM 1110 that acts between NFVI-PoP1 1122 and NFVI-PoP2 1124. Although shown as separate entities, the two WIMs 1110 may be combined, along with the two SDN-Cs 1112, so that there is only one set of a WIM and a corresponding SDN-C outside the data centers. The number of WIMs and corresponding SDN-Cs is an operational decision.

Figure 12:
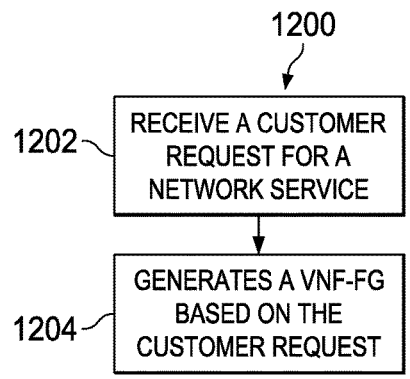
FIG. 12 illustrates a flowchart of an embodiment method for NFV-MANO.

FIG. 12 illustrates a flowchart of an embodiment method 1200 for NFV-MANO, which may be performed by a processing system. In method 1200 a customer request for a network service is received in step 1202. An AVNF-FG is generated in accordance with the received customer request in step 1204. The VNF-FG can include a plurality of VNFs. In one embodiment, the VNF-FG may include a VNF that is related to network performance assessment and enhancement. In one embodiment, the method 1200 may further determine a NFVI-PoP for each of the plurality of VNFs in the VNF-FG, and instantiate the plurality of VNFs using a VIM and a VNFM at the NFVI-PoPs. In another embodiment, the method 1200 may construct a NS request including the generated VNF-FG, and send the NS request, based on which NFVI-PoPs for the plurality of VNFs may be determined. The constructed NS request may be added to a NS catalog. In another embodiment, the method 1200 may send a command requesting for determination of the NFVI-PoPs for the plurality of VNFs, and receives a message in response to the command indicating determination of the NFVI-PoPs for the plurality of VNFs in the VNF-FG. In yet another embodiment, the method 1200 may also send an acknowledgement message indicating generation of the VNF-FG and determination of the NFVI-PoPs for the plurality of VNFs in the VNF-FG, in response to the customer request.

Figure 13:
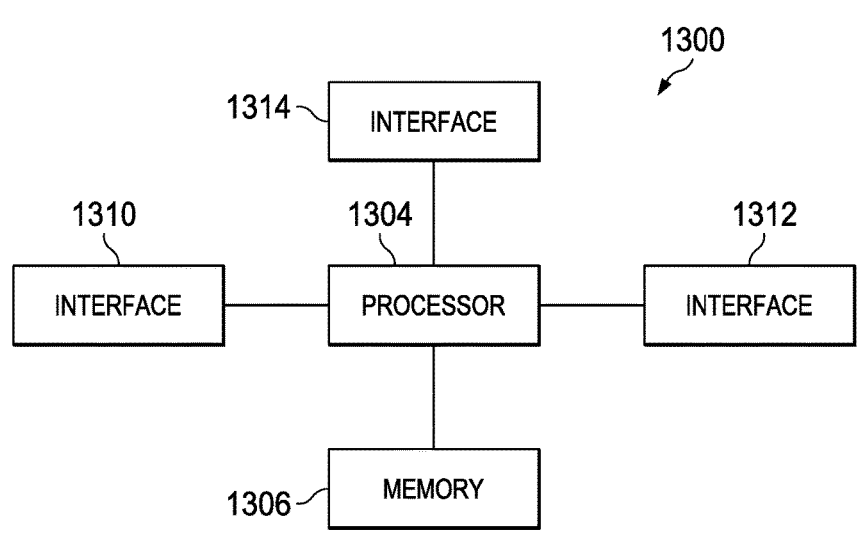
FIG. 13 illustrates a block diagram of an embodiment processing system.

FIG. 13 illustrates a block diagram of an embodiment processing system 1300 for implementing the systems and methods described herein, which may be installed in a host device. The processing system 1300 may be used to perform the functions of any one or more of the orchestrator, SDT-FG entity and SDT-PoP entity in the embodiments of the present disclosure. As shown, the processing system 1300 includes a processor 1304, a memory 1306, and interfaces 1310-1314, which may (or may not) be arranged as shown in FIG. 13. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in FIG. 13, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
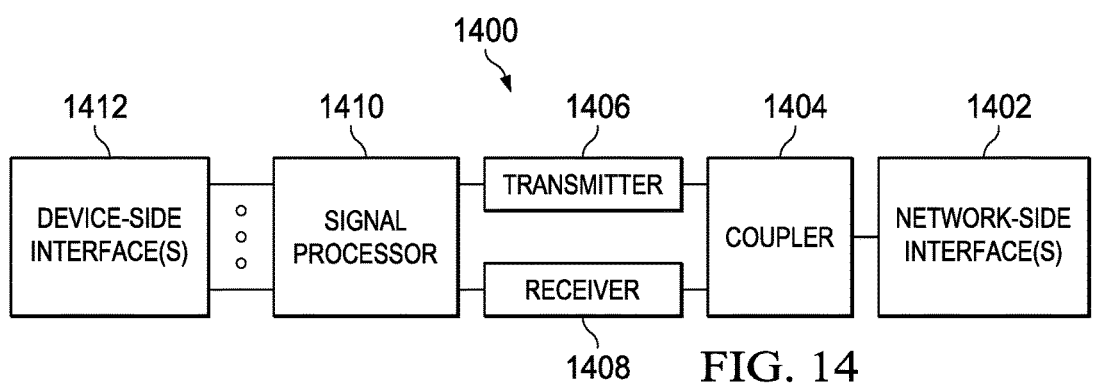
FIG. 14 illustrates a block diagram of an embodiment transceiver.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and one or more device-side interfaces 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for network functions virtualization (NFV)-management and orchestration (MANO) comprising:
receiving, by a software defined topology field graph (SDT-FG) entity of a processing system, a customer request for a network service, the customer request including a checklist of network components and network service requirements for constructing the network service;
constructing, by the SDT-FG of the processing system, the network service using the checklist included in the customer request;
generating, by the SDT-FG of the processing system, a virtualized network function (VNF)-forwarding graph (FG) according to the constructed network service using a network service catalog, the VNF-FG comprising a plurality of VNFs and a link connecting two of the plurality of VNFs;
constructing, by the SDT-FG entity of processing system, a network service request comprising the generated VNF-FG and the constructed network service;
sending, by the SDT-FG entity of processing system, the constructed network service request for determining a network function virtualization infrastructure point of presence (NFVI-PoP) for each of the plurality of VNFs in the generated VNF-FG;
receiving, by a software defined topology point of presence (SDT-PoP) entity or an orchestrator of the processing system, the constructed network service request;
determining, by the SDT-PoP entity of the processing system, the NFVI-PoP for each of the plurality of VNFs in the VNF-FG; and
transmitting, by the SDT-PoP entity or the orchestrator of the processing system, an instruction to instantiate the plurality of VNFs using a virtual infrastructure manager (VIM) and a virtual network function manager (VNFM).

2. The method of claim 1, further comprising:
instantiating the plurality of VNFs using the VIM and the VNFM.

3. The method of claim 1, wherein the sending the constructed network service request comprises:
sending, by the SDT-FG entity of the processing system, a command requesting determination of NFVI-PoPs for the plurality of VNFs in the VNF-FG to the SDT-Pop entity of the processing system.

4. The method of claim 3, further comprising:
receiving, by the SDT-FG entity in response to the command, a message sent by the SDT-POP entity indicating the determination of the NFVI-PoPs for the plurality of VNFs in the VNF-FG.

5. The method of claim 4, further comprising:
sending, by the SDT-FG entity in response to the customer request, an acknowledgement message indicating generation of the VNF-FG and the determination of the NFVI-PoPs for the plurality of VNFs in the VNF-FG.

6. The method of claim 1, wherein the VNF-FG comprises a VNF that is related to network performance assessment and enhancement.

7. An apparatus, comprising:
a processor; and
a non-transitory computer readable storage medium storing programming for execution by the processor, the programming including instructions for:
receiving a customer request for a network service, the customer request including a checklist of network components and network service requirements for constructing the network service;
constructing the network service using the checklist included in the customer request;

generating a virtualized network function (VNF)-forwarding graph (FG) according to the constructed network service using a network service catalog, the VNF-FG comprising a plurality of VNFs and a link connecting two of the plurality of VNFs;

constructing a network service request comprising the generated VNF-FG and the constructed network service;

sending the constructed network service request for determining a network function virtualization infrastructure point of presence (NFVI-PoP) for each of the plurality of VNFs in the generated VNF-FG receiving the constructed network service request;

determining the NFVI-PoP for each of the plurality of VNFs in the VNF-FG; and transmitting an instruction to instantiate the plurality of VNFs using a virtual infrastructure manager (VIM) and a virtual network function manager (VNFM).

8. The apparatus of claim 7, wherein the programming comprises further instructions for:

instantiating the plurality of VNFs using the VIM and the VNFM; and adding the network service request to the network service catalog.

9. The apparatus of claim 7, wherein the sending the constructed network service request comprises:

sending a command requesting for determination of NFVI-PoPs for the plurality of VNFs in the VNF-FG to a software defined topology point of presence (SDT-PoP) entity.

10. The apparatus of claim 9, wherein the programming comprises further instructions for:

receiving, in response to the command, a message sent by the SDT-POP entity indicating the determination of the NFVI-PoPs for the plurality of VNFs in the VNF-FG.

11. The apparatus of claim 10, wherein the programming comprises further instructions for:

sending, in response to the customer request, an acknowledgement message indicating generation of the VNF-FG and the determination of the NFVI-PoPs for the plurality of VNFs in the VNF-FG.

12. A computer program product comprising a non-transitory computer readable storage medium storing programming, the programming including instructions to:

receive a customer request for a network service, the customer request including a checklist of network components and network service requirements for constructing the network service;

constructing the network service using the checklist included in the customer request;

generate a virtualized network function (VNF)-forwarding graph (FG) according to the constructed network service using a network service catalog, the VNF-FG comprising a plurality of VNFs and at least a link connecting two of the plurality of VNFs;

construct a network service request comprising the generated VNF-FG and the constructed network service;

send the constructed network service request for determining a network function virtualization infrastructure point of presence (NFVI-PoP) for each of the plurality of VNFs in the generated VNF-FG receive the constructed network service request;

determine the NFVI-PoP for each of the plurality of VNFs in the VNF-FG; and transmit an instruction to instantiate the plurality of VNFs using a virtual infrastructure manager (VIM) and a virtual network function manager (VNFM).

13. The computer program product of claim 12, wherein the programming comprises further instructions to:

instantiating the plurality of VNFs using the VIM and the VNFM.

14. The computer program product of claim 13, wherein the programming comprises further instructions to add the constructed network service request to the network service catalog.

15. The method of claim 1, further comprising:

adding the constructed network service request to the network service catalog.

* * * * *